United States Patent [19]

Atanovich

[11] Patent Number: 5,258,610
[45] Date of Patent: Nov. 2, 1993

[54] METHOD AND APPARATUS FOR SENSING THE PRESENCE OF A SHEET BY SHEET CAUSING ATTENUATION OF RADIATION

[75] Inventor: Mark T. Atanovich, Scottsdale, Ariz.

[73] Assignee: Motorola, Inc., Schaumburg, Ill.

[21] Appl. No.: 939,227

[22] Filed: Sep. 2, 1992

[51] Int. Cl.5 .......................... G01V 9/04; H01J 40/14
[52] U.S. Cl. ................... 250/222.1; 250/319; 250/561
[58] Field of Search ............ 250/222.1, 223 R, 316.1, 250/317.1, 319, 556, 557, 561, 571, 572; 356/434, 435, 448

[56] References Cited

U.S. PATENT DOCUMENTS

| | | | |
|---|---|---|---|
| 4,034,186 | 7/1977 | Bestenreiner et al. | 250/319 |
| 4,049,947 | 9/1977 | Bestenreiner et al. | 250/319 |
| 4,323,775 | 4/1982 | Hasegawa et al. | 250/319 |
| 4,352,988 | 10/1982 | Ishida | 250/559 |
| 4,540,887 | 9/1985 | Minerd et al. | 250/561 |
| 4,760,790 | 8/1988 | Birkett | 250/319 |
| 4,841,154 | 6/1989 | Yoshikawa et al. | 250/319 |

*Primary Examiner*—David C. Nelms
*Assistant Examiner*—Stephone B. Allen
*Attorney, Agent, or Firm*—Joe E. Barbee; Rennie William Dover

[57] ABSTRACT

A sheet detection apparatus (10) capable of detecting the presence of a sheet (18). The sheet detection apparatus (10) employs a heater (11) as a thermal emission source that emits radiant energy of a particular wavelength and a detector (12) having an output response that is a function of the particular wavelength and the intensity of the radiant energy of the heater (11). A sheet (18) inserted between the heater (11) and the detector (12) attenuates the emitted radiant received by the detector (12). The sheet detection apparatus (10) is capable of detecting sheets that are either opaque or transparent to visible light.

10 Claims, 1 Drawing Sheet

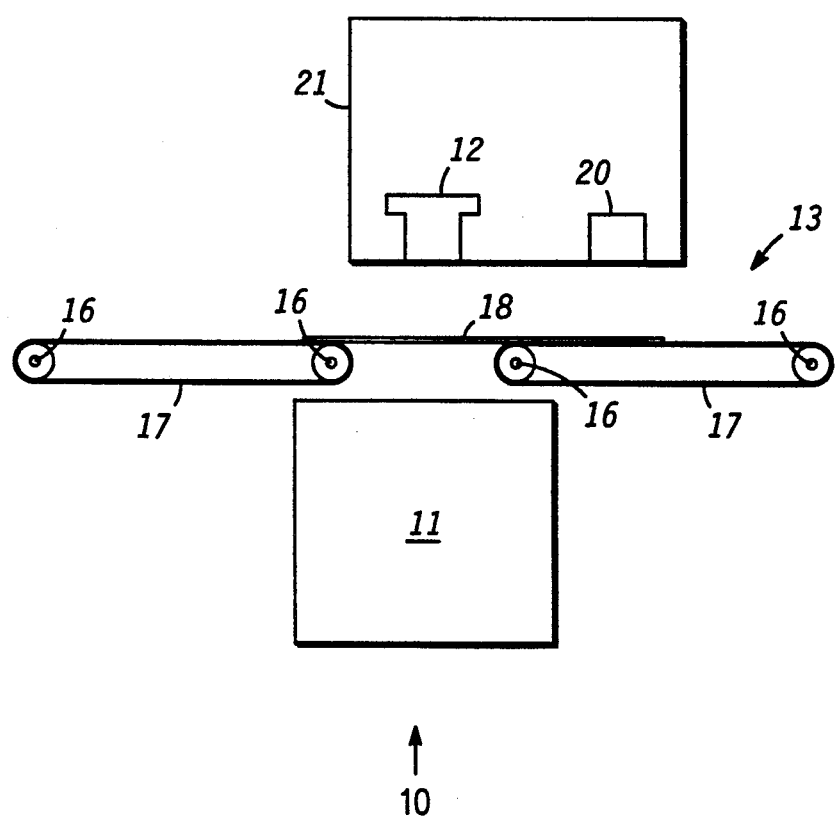

METHOD AND APPARATUS FOR SENSING THE PRESENCE OF A SHEET BY SHEET CAUSING ATTENUATION OF RADIATION

BACKGROUND OF THE INVENTION

This invention relates, in general, to a method of sensing an object and, more particularly, to a method of sensing a sheet.

Some printing steps include feeding a sheet into a printer, forming characters on the sheet with ink, drying the ink, and expelling the sheet from the printer. An important step in printing with, for example, an inkjet printer is sensing or detecting a position of a sheet in the inkjet printer. Many techniques are known for accomplishing positional detection, including a reflective optical sensing technique wherein a light emitting source and an optical sensor, such as a photodetector, are mounted on the printer. The light emitting source is positioned to transmit a light signal to a known position along a path traversed by the sheet. A portion of the light signal is reflected to the optical sensor. When a sheet arrives at the known position along the path, a change in the amount of light reflected to and received by the photodetector occurs. This change in reflected light indicates the presence of a sheet at the known position, thereby detecting or sensing the sheet.

In an optical transmissive technique, a light emitting source and an optical detector are mounted on the printer such that the light emitting source and the optical detector are on opposite sides of the path traversed by the sheet. In the absence of a sheet, the light emitting source transmits an optical signal to the optical detector. When a sheet is positioned between the light emitting source and the optical detector, the amount of light received by the optical detector changes, thereby detecting the presence of a sheet. Thus, this technique employs optical transmission rather than optical reflection.

Although these techniques offer a means for detecting a sheet, they are not without disadvantages. For example, noise generated by the heater for drying the ink may interfere with the signal from the light emitting source in both the optical reflective and optical transmissive techniques when the light emitting source emits light in the infrared spectrum. Further, the optical transmissive technique is unable to detect a sheet transparent to visible light when the light emitting source emits light in the visible spectrum. In addition, both techniques may include extra circuitry that adds to the complexity and price of the systems.

Accordingly, it would be advantageous to have a method for detecting sheets that is immune to noise sources within the printer and is capable of detecting sheets that are either opaque or transparent to visible light. Moreover, it would be advantageous for the method to decrease the number of components required for detecting sheets, thereby lowering the price of the printer as well as the potential maintenance costs of the printer.

SUMMARY OF THE INVENTION

Briefly stated, the present invention is a method of detecting a sheet. The method includes providing a heater and a detector capable of detecting radiant energy emitted by the heater. A sheet is inserted between the heater and the detector, wherein the sheet changes an amount of the radiant energy detected by the detector.

BRIEF DESCRIPTION OF THE DRAWING

The single figure is a highly simplified side view of an embodiment of a sheet detection apparatus in accordance with the present invention.

DETAILED DESCRIPTION OF THE DRAWING

Many printers are available that detect and indicate a position of a sheet along a path traversed by the sheet. A major impediment hampering detection of a sheet in an inkjet printer is the presence of noise generated by a heater for drying ink. Typically, this noise is part of a background noise level that must be overcome to accurately indicate the position of the sheet in the printer. The present invention teaches a method of using the noise or signal generated by the heater to detect the presence of a sheet.

As used herein, the term sheet refers to a thin media upon which a printer prints characters using ink. Examples of such, include paper, plastics, or the like.

The single figure illustrates a highly simplified side view of an embodiment of a sheet detection apparatus 10 in accordance with the present invention. The single figure shows sheet detection apparatus 10 comprising a source of radiant energy 11, and a sheet transport mechanism 13, and a print housing 21, wherein print housing 21 includes a detector 12 and a print head 20. Source of radiant energy 11 and detector 12 are spaced apart. In one preferred embodiment, source 11 is a heater 11 and detector 12 is an infrared radiation detector. Sheet transport mechanism 13 is between source of radiant energy 11 and detector 12. Although sheet transport mechanism 13 is shown as a set of rollers 16 which move belts 17 on which a sheet 18 is supported, it shall be understood that the type of sheet transport mechanism 13 is not a limitation of the present invention. In other words, sheet transport mechanism 13 may employ a tractor feed, or a friction feed, or any of the techniques for transporting sheets that are well known in the art. Sheet transport mechanism 13 serves as a means for positioning a sheet between heater 11 and detector 12. Sheet detection apparatus 10 may be a portion of, for example, a printer (not shown).

In operation, sheet 18 is transported by sheet transport mechanism 13 to print housing 21. In a first example sheet 18 is opaque to visible light, such as a sheet of paper. In a second example, sheet 18 is transparent to visible light, such as a transparency. Print head 20 patterns ink on sheet 18. Typically, the ink contains moisture that must be removed prior to expelling sheet 18 from sheet detection apparatus 10. Thus, the sheet is inserted between heater 11 and detector 12, wherein radiant energy from heater 11 dries the ink. Heater 11 produces thermal emissions of a particular wavelength for drying ink on a sheet. More particularly, the thermal emissions are infrared radiation having a wavelength of at least 720 nanometers (nm), and an intensity or signal strength greater than that of other thermal emissions present in the ambient or background environment. Thus, the thermal emissions serve both as a signal source for detector 12 and a means for drying ink.

Detector 12 is selected to be responsive to signals emitted by heater 11. In the absence of sheet 18 between heater 11 and detector 12, detector 12 puts forth an output response as a function of the wavelength and intensity of the thermal emission of heater 11. In particular, in the absence of sheet 18 between heater 11 and detector 12, the intensity of the thermal emissions arriving at detector 12 is substantially the same as the thermal emissions emitted by heater 11.

Sheet transport mechanism 13 positions or inserts sheet 18 between heater 11 and detector 12. Typically sheet 18 attenuates the intensity of the thermal emissions arriving at detector 12. Detector 12 senses a reduction in the intensity of the thermal emissions and puts forth an output response as a function of the attenuated input signal. Thus the presence of sheet 18 between heater 11 and detector 12 is detected or sensed. Because the detector senses the attenuation of thermal emissions, the technique is readily applicable to detecting sheets that are either opaque or transparent to visible light; since either type of sheet will attenuate thermal emissions. After its detection, sheet 18 is moved by sheet transport mechanism 13, to permit detection of a subsequent sheet (not shown).

By now it should be appreciated that there has been provided a method for detecting a sheet, wherein the method takes advantage of thermal emissions from a component already present in a system such as a heater. The method uses thermal emission noise as an input signal to a detector. Thus, the negative aspects of a noise generating component such as a heater become a positive attribute. Further, use of a component already present in the system, enables operation of the system with fewer components, thereby lowering the price of the system as well as potential maintenance costs. Finally, the invention teaches a method of detecting sheets that are either opaque or transparent to visible light.

I claim:

1. A method of sensing the presence of a sheet in a printer, comprising the steps of:
   providing the printer, wherein the printer has a heater for drying ink which emits infrared radiation;
   providing an infrared radiation detector, wherein an output response of the infrared radiation detector is a function of the intensity of infrared radiation detected; and
   temporarily inserting a sheet between the heater and the infrared radiation detector, wherein a presence of the sheet attenuates the intensity of infrared radiation received by the infrared radiation detector.

2. A method of sensing the presence of a sheet as claimed in claim 1 wherein the step of temporarily inserting the sheet includes temporarily inserting a sheet opaque to visible light.

3. A method of sensing the presence of a sheet as claimed in claim 1 wherein the step of temporarily inserting the sheet includes temporarily inserting a sheet transparent to visible light.

4. A sheet detection apparatus, which comprises:
   a heater that generates thermal emissions for drying ink on a sheet, wherein the thermal emissions are greater than other thermal emissions present in an ambient environment;
   a detector capable of detecting the thermal emissions from the heater wherein the heater and the detector are spaced apart; and
   means for positioning a sheet between the heater and the detector, wherein in the absence of the sheet between the heater and the detector, an intensity of the thermal emissions is substantially the same as the emissions emitted by the heater and the sheet attenuates the intensity of the thermal emissions arriving at the detector.

5. A sheet detection apparatus as claimed in claim 4, wherein the thermal emissions generated by the heater have a wavelength in the infrared spectrum.

6. A sheet detection apparatus as claimed in claim 4, wherein the sheet is opaque to visible light.

7. A sheet detection apparatus as claimed in claim 4, wherein the sheet is transparent to visible light.

8. A method of detecting a sheet, comprising the steps of:
   providing a source of radiant energy, the radiant energy having a particular wavelength and capable of drying ink;
   providing a detector capable of detecting the particular wavelength of the radiant energy; and
   inserting a sheet between the source of radiant energy and the detector, wherein the sheet attenuates an intensity of the radiant energy detected by the detector.

9. A method of detecting a sheet as claimed in claim 8 wherein the step of inserting the sheet includes inserting a sheet opaque to visible light.

10. A method of detecting a sheet as claimed in claim 9 wherein the step of inserting the sheet includes inserting a sheet transparent to visible light.

* * * * *